K. KOTTMEYER.
BANJO ATTACHMENT.
APPLICATION FILED DEC. 5, 1921.

1,430,086.

Patented Sept. 26, 1922.

Witness:
Otto Wagner

Inventor
K. Kottmeyer
By Laurence Langner
Attorney

Patented Sept. 26, 1922.

1,430,086

UNITED STATES PATENT OFFICE.

KILLIANUS KOTTMEYER, OF MILWAUKEE, WISCONSIN.

BANJO ATTACHMENT.

Application filed December 5, 1921. Serial No. 520,093.

*To all whom it may concern:*

Be it known that I, KILLIANUS KOTTMEYER, citizen of the United States of America, and resident of city of Milwaukee, in the county of Milwaukee and State of Wisconsin, have invented a certain new and useful Banjo Attachment, of which the following is a specification.

This invention relates to the art of banjos and has for its object to provide improved means for detachably securing the outer end of the usual cross-brace or dowel stick to the rim of a banjo.

Heretofore it has been customary to pass an iron screw through the rim of the banjo head directly into the end of the dowel stick, as illustrated, for instance, in U. S. Patent No. 249,321.

It is often desirable when the hide breaks to remove the rim with the broken hide and substitute an extra rim and hide. This necessitates removing the screw which secures the dowel stick to the rim and replacing it again when the extra rim is substituted. In a short time the screw becomes loose because it tends to bore out a hole in the end of the dowel stick like a gimlet and eventually a new dowel stick must be provided.

It is to avoid this drawback and to provide an attachment to be put on the end of the dowel stick in banjos and similar instruments, for the purpose of holding the frame firm and preventing the instrument from becoming out of tune, that the present invention has been devised.

With the above and such other objects in view as may hereinafter appear, the invention consists in the novel construction, combination and arrangement hereinafter described and claimed.

The invention is illustrated in the accompanying drawings, in which,—

Figure 1:
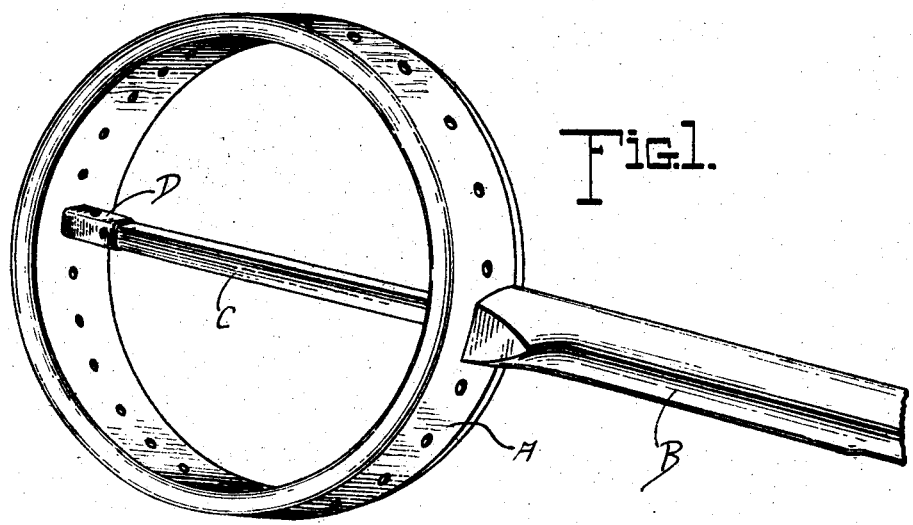
Fig. 1 is a perspective view of a banjo rim showing my improved attachment in use.
Figure 2:
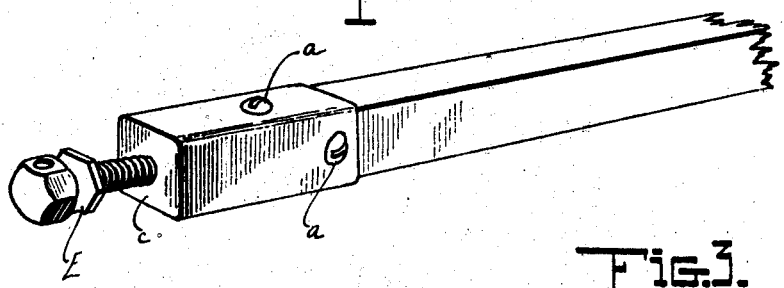
Fig. 2 is a perspective view of the end portion of the dowel stick showing the attachment secured thereto and the co-operating screw.

Referring to the drawings, A designates the rim of the banjo, B the neck and C the cross-brace or dowel stick. The dowel stick may be attached at its inner end in any suitable manner to the neck or may form an integral extension thereof.

For securing the outer end of the dowel stick to the rim, it is provided with a ferrule D. The ferrule D embraces the end of the dowel stick and is secured thereto by small bolts $a$. The ferrule is provided with a screw threaded socket to receive the screw E, which extends through the rim for securing the outer end of the dowel stick thereto.

Figure 3:
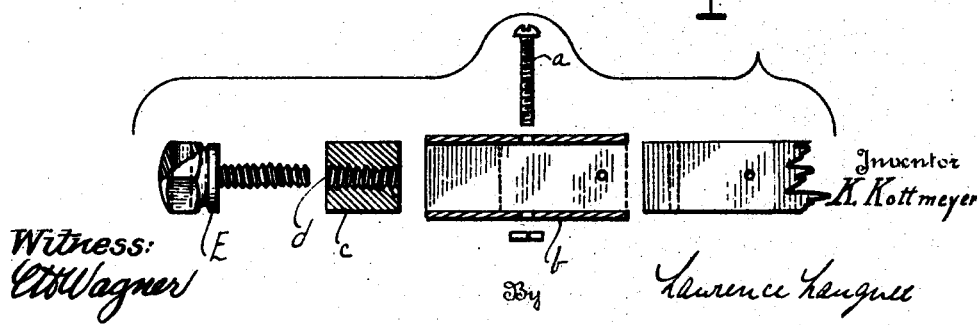
Fig. 3 is a view showing the parts of the attachment, the co-operating screw and the end portion of a dowel stick.

The construction of the ferrule is illustrated in detail in Fig. 3. An oblong hollow member $b$, rectangular in cross-section is formed by suitably bending up a metal blank, preferably of brass. Into one end of this hollow member is secured, by soldering or otherwise, a solid portion $c$ having the screw threaded socket $d$ for co-operation with the screw E. Thus is provided a ferrule having one end portion hollow for receiving the end of the dowel stick and the other end portion solid and provided with a screw threaded socket for receiving the screw E.

It is to be understood that I do not limit myself to the specific manner of making the ferrule above described. Obviously the member $b$ need not be rectangular in cross-section and the screw threaded socket $d$ need not necessarily be made in a member separate from the member $b$. The important feature of the invention is the provision of a ferrule or attachment for the end of the dowel stick having a metal screw threaded socket for co-operation with the screw which secures the outer end of the dowel stick to the banjo rim whereby the screw may be removed and replaced as often as desired without danger of a loose connection between the dowel stick and rim.

Having now described my invention in detail, what I claim as new and desire to secure by Letters Patent is:

1. In a banjo, the combination with the rim and dowel stick, of a metal ferrule having a socket in its inner end portion receiving the outer end of said dowel stick and a screw-threaded socket in its outer end portion, means securing said ferrule to said dowel stick, and a screw extending through said rim and into said screw-threaded socket for firmly securing said rim and dowel stick together, said screw-threaded socket being of sufficient depths to provide a firm anchorage for the screw independent of the dowel stick.

2. An attachment for the end of a banjo dowel stick, said attachment comprising a hollow member adapted to receive and be secured to one end portion of the dowel stick, and a metal plug secured in one end portion of said hollow member and having a screw-threaded socket therein adapted to receive a screw for securing the banjo rim to said dowel stick, said screw-threaded socket being of sufficient depths to provide a firm anchorage for the screw independent of the dowel stick.

Signed at Milwaukee, in the county of Milwaukee and State of Wisconsin, this 2nd day of December, A. D. 1921.

KILLIANUS KOTTMEYER.